July 29, 1952 — H. K. RICHWINE — 2,605,016
SEEDING DISTRIBUTING STRUCTURE
Filed Aug. 18, 1950
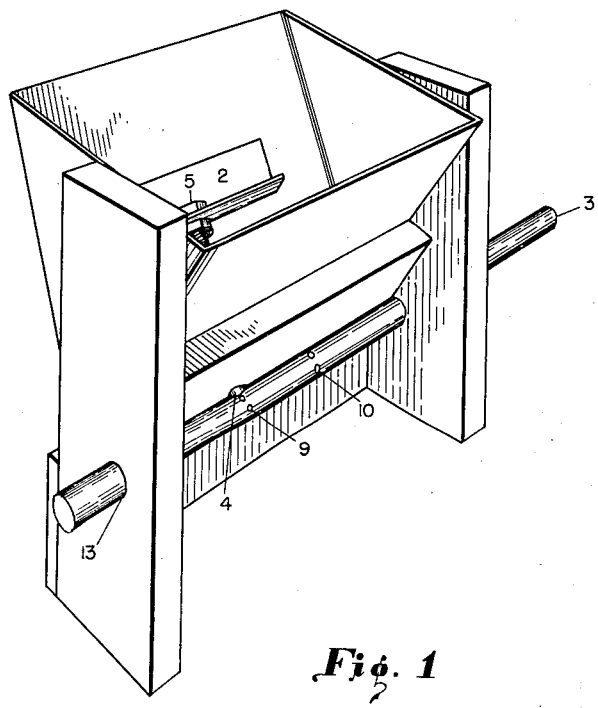
Fig. 1
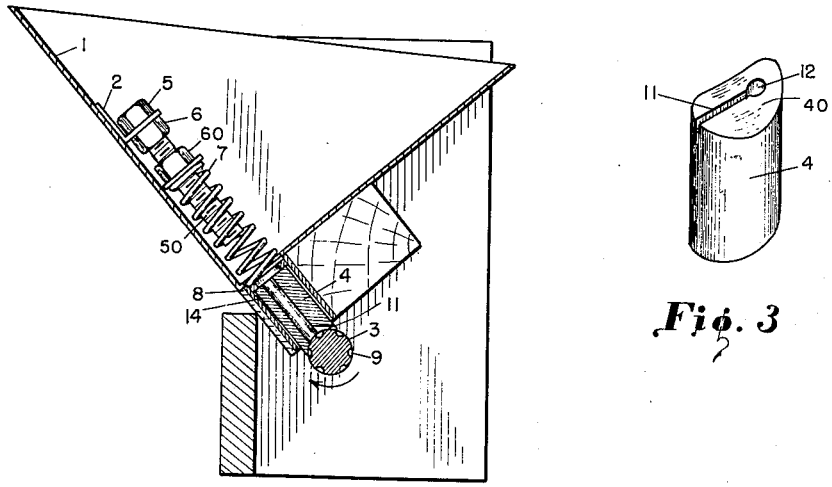
Fig. 2
Fig. 3
INVENTOR
H. K. RICHWINE
ATTORNEY

Patented July 29, 1952

2,605,016

UNITED STATES PATENT OFFICE 2,605,016

SEEDING DISTRIBUTING STRUCTURE

Hugh K. Richwine, Dodge City, Kans.

Application August 18, 1950, Serial No. 180,293

5 Claims. (Cl. 222—9)

(Granted under the act of March 3, 1883, as amended April 30, 1928; 370 O. G. 757)

The invention herein described may be manufactured and used by or for the Government of the United States of America for governmental purposes throughout the world, without the payment to me of any royalty thereon.

This invention relates to a seed distributor, primarily for planting of grass and legumes, for attachment to drills, planters, tractors, aeroplanes, and other carriers and implements.

An object of this invention is to provide a means of evenly distributing seeds in positive controlled quantities, at slow or fast rates of travel, from a seed box without leakage of seeds through cracks or crevices.

A further object of this invention is to provide the seed distributing structure with simple means for adjusting the quantity of seed discharged.

Another object of this invention is to provide in a seed distributing structure an easily removable seed tube and seal, held in contact with the seed distribution shaft by a spring, which may be removed to permit easy and thorough cleaning of seed from the supply box.

In the drawings:

Figure 1 is a view of the seed distributing structure including the seed box.

Figure 2 is a cross section view through one seed tube element.

Figure 3 is a detailed drawing of seed tube and seal element in inverted position and rotated 180°.

The apparatus comprises a seed box 1 in which is mounted an L-shaped bracket 2. Spring 7 is supported in place by a nut and bolt unit. The spring presses a felt washer 8 against the upper end of the cylindrical tube 4, thus sealing the small space or sliding fit between tube 4 and pipe 14. Nut 60 is movable longitudinally of bolt 50, to adjust the pressure of the spring. Nuts 5 and 6 are for fastening the bolt 50 on the bracket. Tube 4 feeds the seed downwardly to cups 9 and 10, which are countersunk in distributor shaft 3. The shaft rotates clockwise in Figure 2, as shown.

Tube 4 is provided with an off-center bore 12 and a slot or groove 11 through which seed projecting above the cups 9 and 10 can pass without cracking. The surface 40 of the tube is curved to seal against and fit the contour of the cylindrical distributor shaft 3.

The series of cups 9 are smaller than the cups 10. The quantity of seed discharged can be controlled by sliding the shaft 3 horizontally in large cylindrical bearing sleeve 13, to align the cups of the size desired with tube 4. The speed of rotation of the shaft 3 is adjusted by any conventional drive, through a ground wheel for example.

In operation, the seed drops down through bore 12 into a cup 9 or 10. Shaft 3 carries the seed upwardly and laterally through the horizontal groove or slot 11 and discharges it by gravity downwardly.

Having thus described my invention, I claim:

1. In an apparatus for evenly distributing seeds in controlled quantities, a seed hopper having a lower seed outlet, a substantially horizontal cylindrical seed distributor shaft rotating about its longitudinal axis, seed receiving pockets in the surface of the shaft, the pockets being shallow surface indentations, an upwardly extending tube having a restricted bore communicating with the hopper seed outlet above and with one of said seed receiving pockets below, the tube being transverse to the distributor shaft, the seed being fed through the tube to the pocket, the tube being slidably mounted for movement longitudinal to its axis, the lower end face of the tube being curved to fit the contour of the distributor shaft, resilient means holding the tube against the shaft, the resilient means being adjustable longitudinally of the tube, an open faced shallow lateral groove in the lower curved end face of the tube, the groove communicating with and terminating at the bore of the tube at one end and being open at the other end to assist in emitting the seeds, the seeds being carried in the pockets, seeds projecting above the pockets passing through the groove without cracking.

2. The apparatus of claim 1 in which the tube extends at an angle to the vertical.

3. The apparatus of claim 1 in which the shaft has a second series of surface indentations of a larger size than, and longitudinally offset from, the first, the shaft being moveable longitudinally to place the second series at the lower end of the tube bore.

4. In an apparatus for evenly distributing seeds in controlled quantities, a seed hopper having a lower seed outlet, a substantially horizontal cylindrical seed distributor shaft mounted for rotation about its longitudinal axis, seed receiving pockets in the surface of the shaft, the pockets being shallow surface indentations, an upwardly extending tube having a restricted bore communicating with the hopper seed outlet above and with a seed receiving pocket below, the seed being fed through the tube to the pocket, the tube being slidably mounted for movement longitudinally to its axis, the lower end of the tube being curved to fit the contour of the distributor shaft, and spring means holding the tube against the shaft.

5. The apparatus of claim 4 in which a pipe extends downwardly from the seed hopper, the tube being slidably mounted in the pipe, an annular sealing gasket seated in the pipe on the upper end of the tube, the spring means pressing the gasket against the tube.

HUGH K. RICHWINE.

REFERENCES CITED

The following references are of record in the file of this patent:

UNITED STATES PATENTS

| Number | Name | Date |
|---|---|---|
| 1,317,133 | Hilton | Sept. 23, 1919 |
| 1,519,928 | Prlesnite | Dec. 16, 1924 |
| 1,866,294 | Chott | July 5, 1932 |
| 2,044,153 | Colton | June 16, 1936 |
| 2,399,472 | De La Roza, Sr. | Apr. 30, 1946 |
| 2,479,878 | Strelzoff | Aug. 23, 1949 |
| 2,538,320 | Mylting | Jan. 16, 1951 |